UNITED STATES PATENT OFFICE.

FRIEDRICH KRAFT, OF BRUGG, SWITZERLAND; OTTILIE EMILIE KRAFT, WIDOW, AND GUARDIAN OF THE MINOR CHILDREN OF SAID FRIEDRICH KRAFT, DECEASED, ASSIGNOR TO C. F. BOEHRINGER & SOEHNE, OF MANNHEIM-WALDHOF, GERMANY.

GLYCOSID AND PROCESS OF MAKING THE SAME.

1,180,657.     Specification of Letters Patent.     Patented Apr. 25, 1916.

No Drawing.     Application filed December 16, 1911. Serial No. 666,145.

*To all whom it may concern:*

Be it known that I, FRIEDRICH KRAFT, citizen of Switzerland, residing at Brugg, Switzerland, have invented certain new and useful improvements in Glycosids and Processes of Making the Same; and I do hereby declare the following to be a full, clear, and exact description of the invention, such as will enable others skilled in the art to which it appertains to make and use the same.

I have found that a hitherto unknown glycosid can be prepared from *Digitalis purpurea*, such glycosid possessing the therapeutically valuable properties of cardiac stimulation peculiar to digitalis. This substance differs from all pure substances hitherto separated from digitalis in its greater solubility in water; it consequently possesses advantages from the point of view of medical administration, as for example for injection.

The new glycosid exhibits interesting chemical properties, above all a remarkable capacity for conversion into other forms; this is probably the reason why it has not hitherto been observed. It is a white neutral amorphous powder indifferent to the action of air, and melting at 150° C.; it yields with sulfuric acid solution of ferric oxid a violet color reaction and dissolves in about 600 parts of water at 15° C. The aqueous solution becomes opalescent on heating to 30°; a further rise of temperature results in the precipitation of a new substance, an iso-glycosid, which can be obtained in fine crystals by recrystallization from alcohol. Whereas the new amorphous glycosid dissolves readily in chloroform without decomposition, it is converted into a hydrate by treating it with a small amount of dilute alcohol; this hydrate separates at once in microscopic crystals which melt at 75° C. and require 3000 parts of water for solution. By dissolving in chloroform and precipitating with petroleum ether or by careful evaporation (*in vacuo*) of the solution, the hydrate can be reconverted into the original amorphous easily soluble substance. This formation of a hydrate may therefore be practically employed for purifying the glycosid. On the other hand, if the glycosid is allowed to remain in contact with alcohol or acetone or similar reagents for some length of time, it is gradually converted into another glycosid which may be termed an iso-glycosid, which is also formed when the aqueous solution is heated. This new iso-glycosid can be very accurately characterized and distinguished from the other digitalis glycosids. It is quite insoluble in water and very sparingly so in chloroform and other solvents. The best solvent for it is moderately dilute alcohol; 300 parts of alcohol mixed with 60 parts of water will dissolve it at the boiling point. From this solution it crystallizes in beautiful prismatic crystals having the melting point 255° C. A sulfuric acid solution of ferric oxid is colored intensely dark violet; the substance exhibits Kiliani's digitoxose reaction and is split up by hydrolysis into digitoxose and a component of the melting point 218—219° C.

Repeated treatment of the water-soluble glycosid with alcohol and removal of the water-insoluble glycosid by treating the mass with chloroform or water results in the gradual and complete conversion. The soluble glycosid is stable in presence of chloroform, acetylentetrachlorid among other solvents.

From the properties described above the method may be derived which can serve for preparing the substance from the leaves of digitalis. In making extracts from the leaves of digitalis, it is necessary, in the first place, to use solvents which do not react on the glycosid, and to select conditions under which the said glycosid is not affected. This is effected, for example, by preparing aqueous extracts from the same at low temperature. Care must further be taken that at no time during the operation the substance is heated in the presence of water to a temperature of over 30° C. Lastly when organic solvents are employed only such may be used as have no action on the substance as for instance chloroform.

As a result of the above described observations the following method of preparing the new substance from foxglove may be suitably employed. 1000 parts by weight of digitalis leaves are extracted twice with 3000 parts of cold water and the extract purified by treating it with a lead salt. The excess of lead salt is removed from the solution and the glycosid is extracted from the latter (after the same has been if necessary concentrated) with 1000 parts of chloroform. The chloroform solution is freed from digitalic acid and water respectively by shaking the same first with dry soda, then with anhydrous sodium sulfate; it is then concentrated to 100 parts *in vacuo* and thereupon poured into 150 parts of petroleum ether. The glycosid which separates is filtered off, dried and purified by rapid recrystallization from cold dilute alcohol and thereupon reconverted into the amorphous anhydrous soluble form by dissolving in chloroform and precipitating the chloroform solution with petroleum ether.

Having thus fully described my invention, what I claim is:

1. In the art of preparing glycosids, the process which comprises extracting the leaves of foxglove with water at a temperature not exceeding 30° C.

2. In the art of preparing glycosids, the process which comprises extracting the leaves of foxglove with water at a temperature not exceeding 30° C., then purifying the resultant solution and concentrating the same.

3. In the art of preparing glycosids, the process which comprises extracting a water solution containing glycosid from foxglove with an organic solvent at a temperature not exceeding 30° centigrade.

4. In the art of preparing glycosids, the process which comprises extracting a water solution containing glycosid from foxglove with chloroform at a temperature not exceeding 30° centigrade.

5. In the art of preparing glycosids, the process which comprises extracting the leaves of foxglove with water at a temperature not exceeding 30° C., purifying and concentrating the resultant product, and extracting the purified and concentrated mass with a suitable organic solvent.

6. In the art of preparing glycosids, the process which comprises extracting the leaves of foxglove with water at a temperature not exceeding 30° C., purifying and concentrating the resultant product, and extracting the purified and concentrated mass with chloroform.

7. In the art of preparing glycosids, the process which comprises extracting the leaves of foxglove with water at a temperature not exceeding 30° C., purifying and concentrating the resultant product, extracting the purified and concentrated mass with a suitable organic solvent and precipitating with petroleum ether.

8. In the art of preparing glycosids, the process which comprises extracting the leaves of foxglove with water at a temperature not exceeding 30° C., purifying and concentrating the resultant product, extracting the purified and concentrated mass with chloroform and precipitating with petroleum ether.

9. The process of preparing a new glycosid from foxglove which comprises extracting the leaves of foxglove with water and concentrating the solution, in both steps the temperature not exceeding 30° C.

10. The process of preparing a new glycosid from foxglove which comprises extracting the leaves of foxglove with water, purifying the resultant solution and concentrating the same, in all steps the temperature not exceeding 30° C.

11. The process of preparing a new glycosid from foxglove which comprises extracting the leaves of foxglove with water, purifying the resultant solution and concentrating the same, in all steps the temperature not exceeding 30° C., and then extracting with a suitable organic solvent.

12. The process of preparing a new glycosid from foxglove which comprises extracting the leaves of foxglove with water, purifying the resultant solution and concentrating the same, in all steps the temperature not exceeding 30° C., and then extracting with chloroform.

13. The process of preparing a new glycosid from foxglove which comprises extracting the leaves of foxglove with water, purifying the resultant solution and concentrating the same, in all steps the temperature not exceeding 30° C., and then extracting with a suitable solvent and precipitating with petroleum ether.

14. The process of preparing a new glycosid from foxglove which comprises extracting the leaves of foxglove with water, purifying the resultant solution and concentrating the same, in all steps the temperature not exceeding 30° C., and then extracting with chloroform and precipitating with petroleum ether.

15. As a new composition of matter the glycosid obtained from foxglove which is a white neutral body impervious to the action of air, possessing a melting point of 150° C. soluble in 600 parts of water, readily soluble in chloroform, forming a hydrate of the melting point 75° when treated with dilute alcohol and, being converted into another new glycosid having the melting point 255° C. when treated with warm water.

In testimony whereof I hereunto affix my signature in the presence of two witnesses.

Dr. FRIEDRICH KRAFT.

Witnesses:
 Harry A. McBride,
 August Ruegg.